UNITED STATES PATENT OFFICE.

GUSTAVE EY, OF NEW YORK, N. Y.

PLASTIC COMPOSITION.

1,361,759. Specification of Letters Patent. Patented Dec. 7, 1920.

No Drawing. Application filed December 18, 1919. Serial No. 345,839.

*To all whom it may concern:*

Be it known that I, GUSTAVE EY, a citizen of the United States, and a resident of the city of New York, Woodside, borough of Queens, in the county of Queens and State of New York, have invented a new and Improved Plastic Composition, of which the following is a full, clear, and exact description.

This invention relates to a new and useful composition of matter or a new compound used in manufacturing industries for the production of dolls, picture frames, statuettes or, in fact, any and all molded works of art and articles of commerce.

An object of my invention is to produce a composition of matter inexpensive to make, and which has correct physical characteristics and attributes to adapt it to the manufacture of the above described articles. It is a further object to produce a composition of matter, or compound, which does not stick to molds during the manufacturing process and which leaves a smooth-finish surface on the manufactured article. It is a further purpose to produce a compound which has a minimum factor of shrinkage in order that the manufactured article will not change in shape even to the small extent of slight shrinkage.

With the above purposes and others in view the invention has relation to the herein described composition of matter and as more particularly set forth in the appended claims.

In the following composition, the term "asbestos cement" will be construed to consist of substantially equal parts of Portland cement and asbestos fiber.

In preparing the composition there is mixed together portions of—

Flour,
Glue,
Asbestos cement, and
Whiting.

The composition is thoroughly mixed and made up with water to give the desired consistency and provide a compounded material of appropriate plasticity to give the best results when packed in dies or molds used in casting dolls or other articles of commerce.

It is practical to combine the several aforesaid ingredients in the following proportions—

3 parts of flour,
4½ parts of glue,
15 parts of asbestos cement,
57 parts of whiting, and
20½ parts of water.

The above proportions give preferable results but it is obvious that variations in the percentages of ingredients may be made without departing from the invention. After the manufactured dolls or other articles are removed from the dies or molds, they are subjected to a baking process which completes the article.

This composition has a pleasing white color cast and is non-fragile, which makes the manufactured doll or other article practically non-breakable and long lasting in life. The asbestos cement acts to impart a molecular tension in the structural make-up which makes the manufactured article strong and tough; and the whiting imparts a pleasing white cast to the article, leaving a smooth exterior and particularly glossy surface. The mixture of flour and glue compounds to form an indestructible substance of viscous adhesive properties which functions to join all the material together in a composite mass. The composition is fireproof and, thus, articles manufactured from the material will in no way support combustion. The compound has a low factor of shrinkage, which makes for the uniformity of physical expansion and contraction in the slight change of the molded article as it is removed from the mold, and, in fact, the shrinkage is so low as to be negligible.

The above-described composition of matter will find a broad range of use in the art of manufacturing molded articles where it is desired to produce dolls, statuettes or other articles having a finished gloss and perfect shape when the articles are removed from the mold and completed by baking.

Having thus described my invention what I desire to secure by Letters Patent is:

1. A composition of matter comprising the following ingredients, flour, glue, asbestos cement and whiting.

2. A composition of matter comprising the following ingredients compounded in the proportions named; 3 parts of flour, 4½ parts of glue, 15 parts of asbestos cement, 60 parts of whiting, and mixed with water to form a plastic substance appropriate to be packed in molds.

3. A composition of matter comprising the following ingredients compounded in the proportions named; 3 parts of flour, 4½ parts of glue, 15 parts of asbestos cement, 60 parts of whiting, and mixed with 23½ parts of water to form a plastic substance appropriate to be packed in molds or dies.

GUSTAVE EY.